(12) United States Patent
Shoji

(10) Patent No.: US 10,177,821 B2
(45) Date of Patent: Jan. 8, 2019

(54) WIRELESS COMMUNICATION SYSTEM, COMMUNICATION APPARATUS, AND COMMUNICATION METHOD

(71) Applicant: CANON KABUSHIKI KAISHA, Tokyo (JP)

(72) Inventor: Yuki Shoji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/864,758

(22) Filed: Jan. 8, 2018

(65) Prior Publication Data
US 2018/0198491 A1    Jul. 12, 2018

(30) Foreign Application Priority Data

Jan. 11, 2017  (JP) ................. 2017-002713

(51) Int. Cl.
| | |
|---|---|
| H04B 5/00 | (2006.01) |
| H01Q 1/38 | (2006.01) |
| H04B 7/06 | (2006.01) |
| H01Q 7/00 | (2006.01) |

(52) U.S. Cl.
CPC ......... H04B 5/0081 (2013.01); H04B 7/0682 (2013.01); H01Q 7/00 (2013.01)

(58) Field of Classification Search
CPC ...... H04B 5/00; H04B 5/0012; H04B 5/0025; H04B 5/0075; H04B 5/0087; H04M 1/7253; H04M 2250/04; H01Q 1/336; H01Q 1/38; H01Q 9/16; H01Q 9/32; H01Q 9/0407; H02J 7/025; H02J 50/05; H02J 50/10; H02J 50/40

USPC ........ 455/41.1, 41.2, 41.3; 343/700 MS, 908
See application file for complete search history.

(56) References Cited

U.S. PATENT DOCUMENTS

| | | | | |
|---|---|---|---|---|
| 6,380,900 | B1 * | 4/2002 | Kanayama | ............ H01Q 1/243 343/702 |
| 7,750,851 | B2 * | 7/2010 | Washiro | ............... H01Q 1/2225 343/700 MS |
| 9,142,884 | B2 * | 9/2015 | Yukimoto | ................ H01Q 9/36 |
| 9,432,083 | B2 * | 8/2016 | Fujii | ...................... H04B 3/544 |
| 9,692,128 | B2 * | 6/2017 | Kato | ........................ H01Q 7/00 |

FOREIGN PATENT DOCUMENTS

JP          2016-29785 A    3/2016

* cited by examiner

*Primary Examiner* — Quochien B Vuong
(74) *Attorney, Agent, or Firm* — Canon U.S.A., Inc. IP Division

(57) ABSTRACT

A wireless communication system includes a first antenna, a second antenna with an orientation relative to the first antenna that is changeable around a predetermined axis, and a communication control unit that controls wireless communication based on electric field coupling between the first antenna and the second antenna. The first antenna includes a first electrode including a bored portion, where the predetermined axis passes through an inside of the bored portion. The first antenna also includes a second electrode located inside the bored portion. The second antenna includes a third electrode that transmits an electric signal between the first electrode and the third electrode and a fourth electrode that transmits an electric signal between the second electrode and the fourth electrode.

20 Claims, 9 Drawing Sheets

TRANSMISSION SIGNAL

RECEPTION SIGNAL

SHAPED SIGNAL

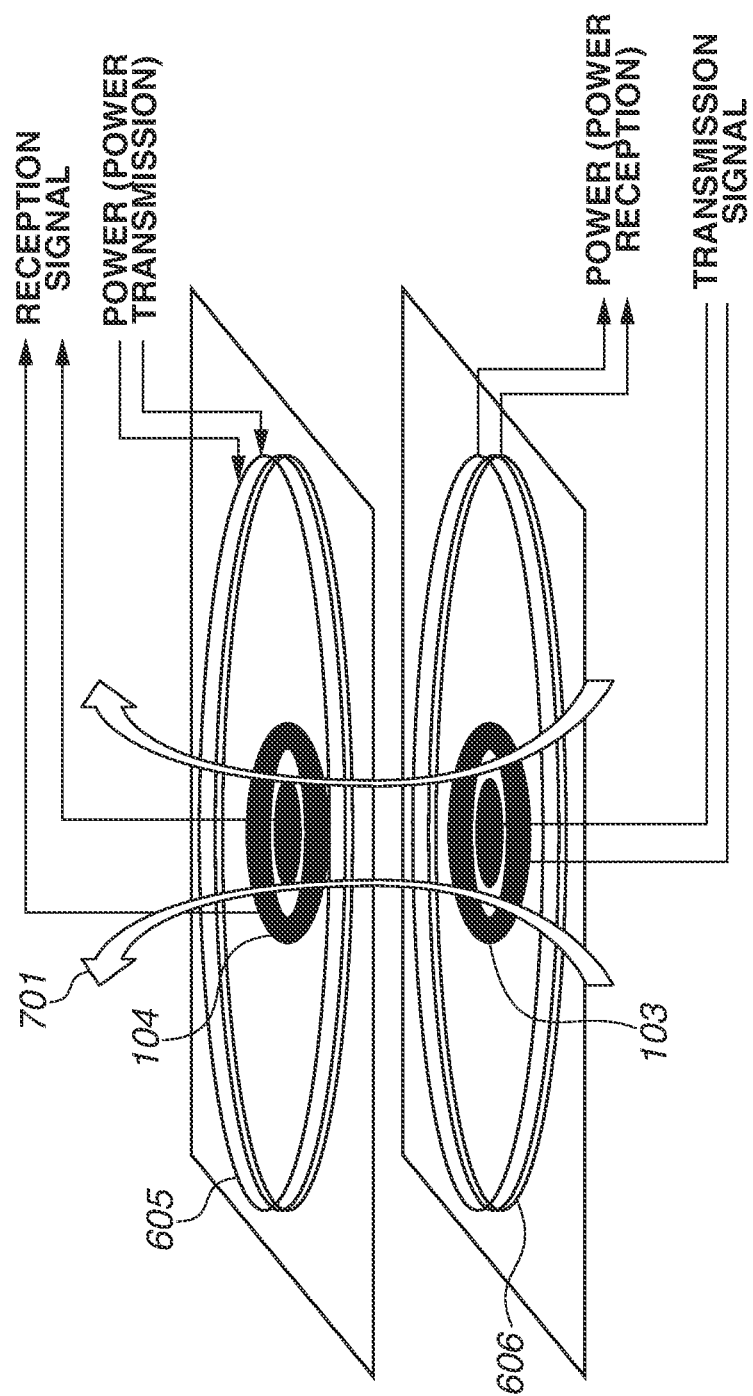

WIRELESS COMMUNICATION SYSTEM, COMMUNICATION APPARATUS, AND COMMUNICATION METHOD

BACKGROUND

Field

The present disclosure relates to a wireless communication system.

Description of the Related Art

In recent years, there has been a system carrying out communication via a rotatable portion, such as an articulation portion of a robot arm, and a joint portion between a network camera and a camera platform. There has also been a system carrying out communication between two apparatuses connectable to each other in a plurality of different orientations, such as a communication cable for a mobile device supporting reversed insertion. When wireless communication is used for the communication in a system like such systems, an orientation of a reception antenna is changeable relative to a transmission antenna.

Japanese Patent Application Laid-Open No. 2016-29785 discusses a method for realizing high-quality communication by carrying out communication based on electromagnetic field using a transmission antenna and a reception antenna, each including two electrodes. More specifically, Japanese Patent Application Laid-Open No. 2016-29785 discusses a method for transmitting data by inputting a differential signal that is an electric signal of opposite phase into a first transmission electrode and a second transmission electrode included in the transmission antenna.

The communication can, however, be destabilized in a system carrying out the wireless communication between one antenna including a plurality of electrodes and another antenna including a changeable orientation relative to the antenna. For example, it is conceivable that efficiency of the communication is substantially changed according to the orientation of the antenna in a case where the electrode included in the one antenna and the electrode included in the other antenna face each other in some orientation, but do not face each other in a different orientation.

SUMMARY

According to an aspect of the present disclosure, a wireless communication system includes a first antenna, a second antenna including an orientation relative to the first antenna that is changeable around a predetermined axis, and a communication control unit configured to control wireless communication based on electric field coupling between the first antenna and the second antenna. The first antenna includes a first electrode including a bored portion, which is configured such that the predetermined axis passes through the inside of the bored portion, and a second electrode located inside the bored portion as viewed from a reference direction that is in parallel with the predetermined axis. The second antenna includes a third electrode configured such that an electric signal is transmitted between the first electrode and the third electrode, and a fourth electrode configured such that an electric signal is transmitted between the second electrode and the fourth electrode.

Further features will become apparent from the following description of exemplary embodiments with reference to the attached drawings.

BRIEF DESCRIPTION OF THE DRAWINGS

FIG. 6 illustrates a configuration of a connection portion in the wireless communication system carrying out the wireless power transmission.

DESCRIPTION OF THE EMBODIMENTS

[System Configuration]

Figure 1:
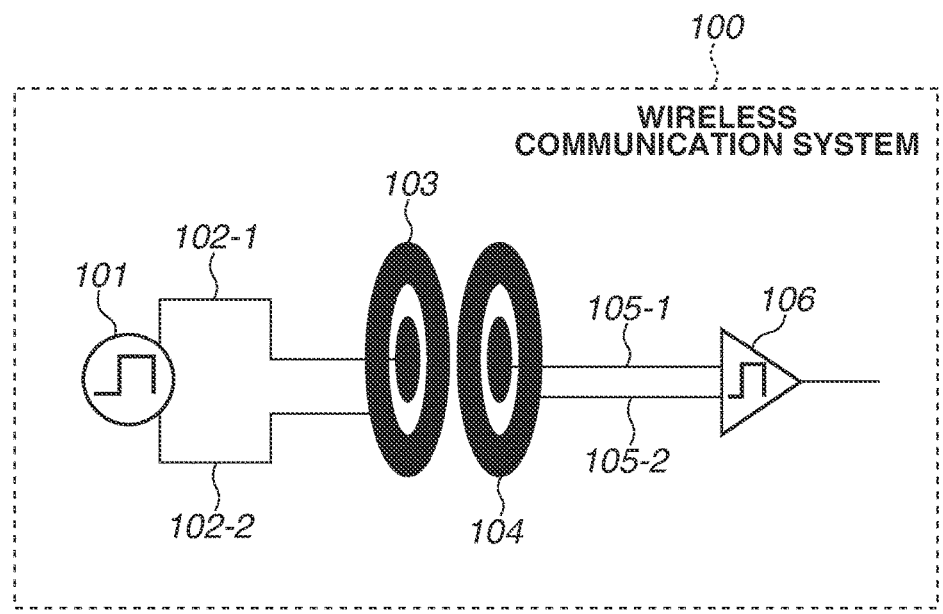
FIG. 1 illustrates a system configuration of a wireless communication system.

FIG. 1 illustrates a schematic configuration of a wireless communication system 100 (hereinafter referred to as a system 100) according to an exemplary embodiment. The system 100 includes a signal source 101, a signal line 102-1, a signal line 102-2, a coupler 103, a coupler 104, a signal line 105-1, a signal line 105-2, and a waveform shaping device 106 (hereinafter referred to as a shaper 106). In the present exemplary embodiment, the signal line 102-1 and the signal line 102-2 will be simply referred to as a signal line 102 when there is no need to distinguish them from each other. Similarly, the signal line 105-1 and the signal line 105-2 will be simply referred to as a signal line 105 when there is no need to distinguish them from each other.

The coupler 103 and the coupler 104 are each a conductor functioning as an antenna for carrying out wireless communication based on electromagnetic field coupling, and each include two electrodes, i.e., an inner electrode and an outer electrode. An electric signal is transmitted between the outer electrode of the coupler 103 and the outer electrode of the coupler 104, and an electric signal is transmitted between the inner electrode of the coupler 103 and the inner electrode of the coupler 104. Specifically, the coupler 103 and the coupler 104 are each configured such that a copper pattern serving as the electrode is formed on a printed circuit board, such as Flame Retardant Type 4 (FR4) or flexible printed circuits. However, the configurations of the coupler 103 and the coupler 104 are not limited thereto. The electromagnetic field coupling according to the present exemplary embodiment includes both electric field coupling (capacitive coupling) and magnetic field coupling. In other words, the wireless communication between the coupler 103 and coupler 104 can be carried out based on the electric field coupling or can be carried out based on the magnetic field coupling. In the present exemplary embodiment, the system 100 will be described, focusing mainly on a case in which the communication is carried out between the coupler 103 and the coupler 104 based on the electric field coupling.

The signal source 101 generates a differential signal and inputs the differential signal to the signal line 102. More specifically, electric signals of opposite phase to each other are input to the signal line 102-1 and the signal line 102-2, respectively. The signal line 102-1 is connected to one of the two electrodes included in the coupler 103 and the signal line 102-2 is connected to the other electrode, and the differential signal generated by the signal source 101 is input to the coupler 103 via the signal line 102. In other words, the electric signals of the opposite phase to each other are input to the two electrodes included in the coupler 103 by the signal source 101.

When the differential signal is input to the coupler 103, a voltage is generated in the coupler 104 based on this input. In other words, an electric signal transmitted from the coupler 103 is received by the coupler 104. The signal line 105-1 is connected to one of the two electrodes included in the coupler 104 and the signal line 105-2 is connected to the other electrode, and the differential signal received by the coupler 104 is transmitted to the shaper 106 via the signal line 105. More specifically, an electric signal received by the outer electrode of the coupler 104 based on the signal input to the outer electrode of the coupler 103, and an electric signal received by the inner electrode of the coupler 104 based on the signal input to the inner electrode of the coupler 103 are input to the shaper 106.

The shaper 106 then generates an electric signal including a form closer to a waveform of the signal output from the signal source 101 based on the electric signals received by the two electrodes. The shaper 106 outputs the generated electric signal to, for example, a functional unit (not illustrated) included in the system 100. The not-illustrated functional unit include a display control unit that displays an image based on the input electric signal on a display unit, and a transfer unit that transfers data based on the input electric signal to an external apparatus. In this manner, the system 100 controls the wireless communication between the coupler 103 and the coupler 104 using the signal source 101 and the shaper 106.

Figure 2A:
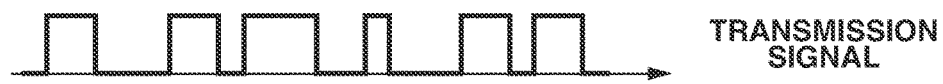
FIGS. 2A to 2C illustrate electric signals input and output in the wireless communication system.
Figure 2B:
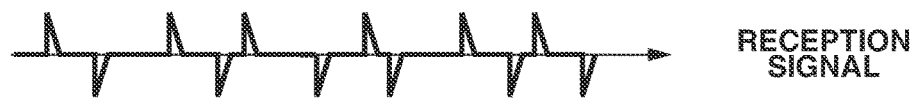
Figure 2C:
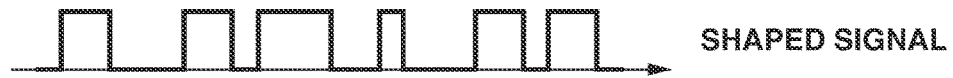

FIGS. 2A to 2C illustrate examples of waveforms of the electric signals input and output in the system 100. A horizontal axis in each of FIGS. 2A to 2C indicates time. First, a transmission signal illustrated in FIG. 2A generated by the signal source 101 is input to the coupler 103 via the signal line 102-1. The coupler 104 is coupled with the coupler 103 by the electric field coupling, so that a reception signal illustrated in FIG. 2B is generated at the coupler 104 based on the transmission signal input to the coupler 103. This reception signal includes a differentiated waveform of the signal input to the coupler 103. Then, the reception signal illustrated in FIG. 2B is input to the shaper 106 via the signal line 105-1.

The signal source 101 inputs a signal of the opposite phase to the transmission signal illustrated in FIG. 2A into the coupler 103 via the signal line 102-2. A signal of the opposite phase to the reception signal illustrated in FIG. 2B is generated at the coupler 104 according to this input, and the generated signal is input to the shaper 106 via the signal line 105-2.

The shaper 106 performs shaping processing on the differential signal input via the signal line 105, and generates a shaped signal illustrated in FIG. 2C that includes a waveform similar to the transmission signal output from the signal source 101. By the above-described process, wireless transmission of digital data is realized. In the present example, the transmitted electric signal is assumed to be a binary digital signal, but is not limited thereto and can be a multivalued signal.

In the present exemplary embodiment, the system 100 is described referring to an example in which the communication is carried out by baseband transmission that is not accompanied by modulation and demodulation of a carrier wave. However, the exemplary embodiment is not limited thereto. The exemplary embodiment can be carried out by inputting a carrier wave modulated based on the signal output from the signal source 101 to the coupler 103, and demodulating the signal output from the coupler 104.

[Example of Application to Network Camera]

Figure 3:
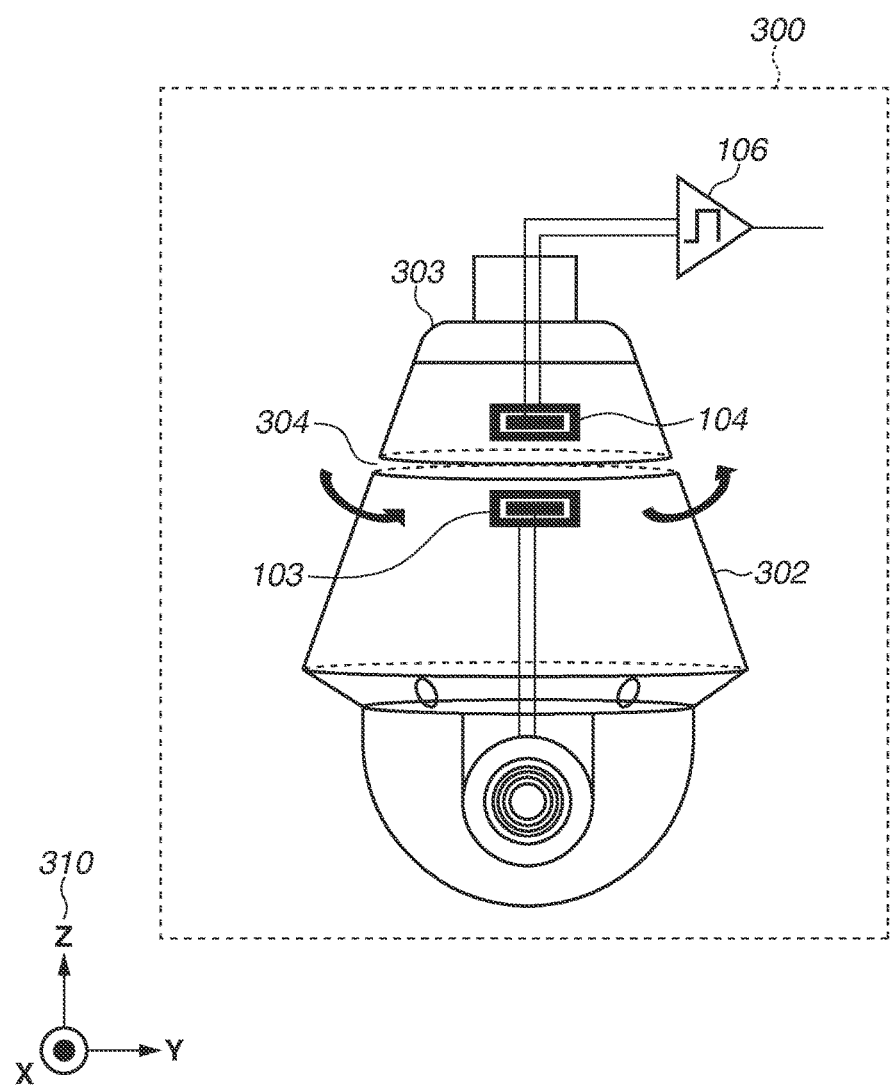
FIG. 3 illustrates an example in which the wireless communication system is applied to a network camera.

An example of a case where the system 100 is applied to transmission of imaging data in a network camera 300 will be described with reference to FIG. 3. The network camera 300 includes an imaging unit 302 and a camera platform 303, and the imaging unit 302 and the camera platform 303 are attachable to and detachable from each other at a connection portion 304 that is a boundary therebetween. The camera platform 303 is fixed to an installation location, such as a ceiling and a wall. When the network camera 300 is configured in this manner, the imaging unit 302 can easily be replaced when replacement of the imaging unit 302 becomes necessary due to a failure or the like.

In the network camera 300, the coupler 103 is included in the imaging unit 302 and the coupler 104 is included in the camera platform 303. Image data based on imaging by an imaging control unit 305 is transmitted from the coupler 103 to the coupler 104, and is transmitted to an external network via the shaper 106. If the wireless communication is used at the connection portion 304 in this manner, a necessity of installing a transmission line for transmitting the image data and a connector at the connection portion 304 can be eliminated, and therefore, space saving and improvement of weather resistance can be realized.

In the present exemplary embodiment, the imaging unit 302 and the camera platform 303 are assumed to be connectable to each other in a plurality of different orientations. For example, the imaging unit 302 can be detached from the camera platform 303 and attached again to the camera platform 303 after being rotated around an axis in a Z-axis direction of a coordinate system 310 by 180 degrees. In such a configuration, the orientation of the imaging unit 302 can be easily changed.

In the present exemplary embodiment, the coupler 103 is formed into a shape, like examples illustrated in FIGS. 4A to 4D, so that, for example, a degree of coupling between the couplers 103 and 104 is prevented from being largely changed even when a change is made to the orientation in the case where the orientation of the coupler 104 is changeable relative to the coupler 103 in this manner. FIGS. 4A to 4D each illustrate the shape when the coupler 103 is viewed from the Z-axis direction of the coordinate system 310.

Figure 4A:
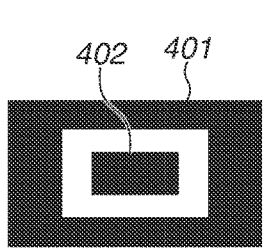
FIGS. 4A to 4D illustrate examples of a shape of a coupler.

In FIG. 4A, the coupler 103 includes an outer electrode 401 and an inner electrode 402. The outer electrode 401 is disposed so as to surround the inner electrode 402. More specifically, the outer electrode 401 includes a bored portion, and the inner electrode 402 is located inside this bored portion so as not to contact the outer electrode 401. The outer electrode 401 includes a nearly point-symmetric shape (a rectangular shape) as viewed from the Z-axis direction perpendicular to a surface of the electrode 401. In such a configuration, the degree of coupling between the couplers 103 and 104 can be kept nearly constant. Consequently, stable communication can be established between the couplers 103 and 104 even when the orientation of the coupler 103 is changeable relative to the coupler 104 around an axis passing through a nearly central point of the bored portion and extending nearly in parallel with the Z-axis direction.

Figure 4B:
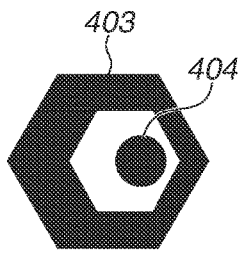
Figure 4C:
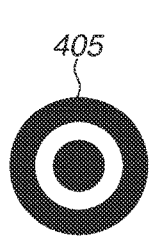

The orientation of the coupler 103 relative to the coupler 104 is not limited to the case where inversion by 180 degrees is possible. The orientation of the coupler 103 can be changeable to different orientations rotated by 60 degrees or 120 degrees. In such a case, the stable communication can be realized by forming an outer electrode 403 into a nearly regular polygonal shape, as illustrated in FIG. 4B. An outer electrode 405 can be formed into a nearly circular shape, as illustrated in FIG. 4C.

Figure 4D:
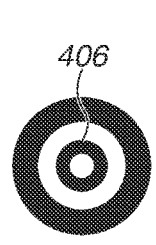

It is desirable to also form the inner electrode of the coupler 103 into the nearly point-symmetric shape, as viewed from the Z-axis direction, and position the inner electrode of the coupler 103 around the center of the bored portion like the electrode 402 illustrated in FIG. 4A because this configuration can keep the degree of coupling between the couplers 103 and 104 nearly constant. However, the configuration of the inner electrode of the coupler 103 is not limited thereto. For example, an inner electrode 404 can be displaced from the center of the bored portion, as illustrated in FIG. 4B, in a case where the system 100 can enable the change the coupling degree to some extent. The rotational axis does not have to pass through a center of the electrode 403 as long as the rotational axis passes through an inside of the electrode 403. If a configuration in which an inner electrode 406 includes a bored portion is employed, as illustrated in FIG. 4D, a shaft member and a wired cable that pass through the center of the coupler 103 can be installed in the connection portion 304.

The coupler 104 can also have a shape like the examples illustrated in FIGS. 4A to 4D. The wireless communication based on the electromagnetic field coupling can be efficiently carried out by arranging the coupler 104 in such a manner that the outer electrodes of the coupler 104 and the coupler 103 at least partially overlap each other and the inner electrodes of the coupler 104 and the coupler 103 at least partially overlap each other, as viewed from the Z-axis direction. However, the shapes of the coupler 104 and the coupler 103 can be different from each other.

A quality of the communication can be improved by keeping small a difference between the degree of coupling between the inner electrodes of the coupler 103 and the coupler 104 and the degree of coupling between the outer electrodes of the coupler 103 and the coupler 104. To this end, for example, it is desirable to arrange the dimension such that the outer electrode includes an area ten or more times an area of the inner electrode in a case where the coupler 103 and the coupler 104 have similar shapes and the outer electrode and the inner electrode are located on the same plane. The communication quality can also be improved by arranging the dimension such that the outer electrode includes an area twice or more the area of the inner electrode. In the present exemplary embodiment, the inner electrode and the outer electrode are assumed to be located on the nearly same plane in each of the coupler 103 and the coupler 104, but are not limited thereto. In other words, the positions of the inner electrode and the outer electrode in the Z-axis direction can be different from each other.

The imaging unit 302 and the camera platform 303 are connectable to each other at the connection portion 304 in the plurality of different orientations in the above description, but the connection portion 304 can include a mechanism that rotationally moves the imaging unit 302 relative to the camera platform 303. For example, the connection portion 304 can rotate the imaging unit 302 around the axis along the Z-axis direction of the coordinate system 310 by rotating a member connecting the imaging unit 302 and the camera platform 303 with use of a motor. If the wireless communication for the communication is used at the connection portion 304 configured to be rotationally movable in this manner, the network camera 300 can, for example, prevent or reduce deterioration over time due to wear, and speed up a data transmission rate compared to carrying out the communication using, for example, a slip ring which is an existing technique, at the connection portion 304.

In the case where the movement control is performed to rotate the imaging unit 302 relative to the camera platform 303, the coupler 103 included in the imaging unit 302 is rotationally moved relative to the coupler 104 included in the camera platform 303. In such a case, the change in the degree of coupling between the coupler 103 and the coupler 104 owing to the rotational movement can be additionally reduced by forming the electrode 405 included in the coupler 103 into the nearly circular shape, as illustrated in FIGS. 4C and 4D. As a result, the network camera 300 can reduce an increase or decrease in an amplitude and reversal of a polarity of the electric signal received by the coupler 104, so that stable data communication can be continued even during the rotational movement.

In this case, it is desirable that the rotational axis is an axis passing through a nearly central point of a bored portion of the electrode 405 and extending nearly in parallel with the Z-axis direction so that the stability of the communication is improved. In addition, the stability of the communication can also be improved by also forming the inner electrode of the coupler 103 into a nearly circular shape like the electrode 404 and the electrode 406. However, the shape of the electrode of the coupler 103 used for this purpose does not necessarily need to be the circular shape, and the coupler 103, shaped as illustrated in FIGS. 4A and 4B, can be used in the case where, for example, the system 100 can enable the change in the degree of coupling to some extent.

[Coexistence with Wireless Power Transmission]

The configuration using the wireless communication for the data communication at the connection portion 304 of the network camera 300 has been described above. In addition, the wireless communication can be used also for power transmission at the connection portion 304, along with the data communication. Since the wireless power transmission eliminates a necessity of installing a cable for transmitting power to the connection portion 304, convenience is increased.

Figure 5:
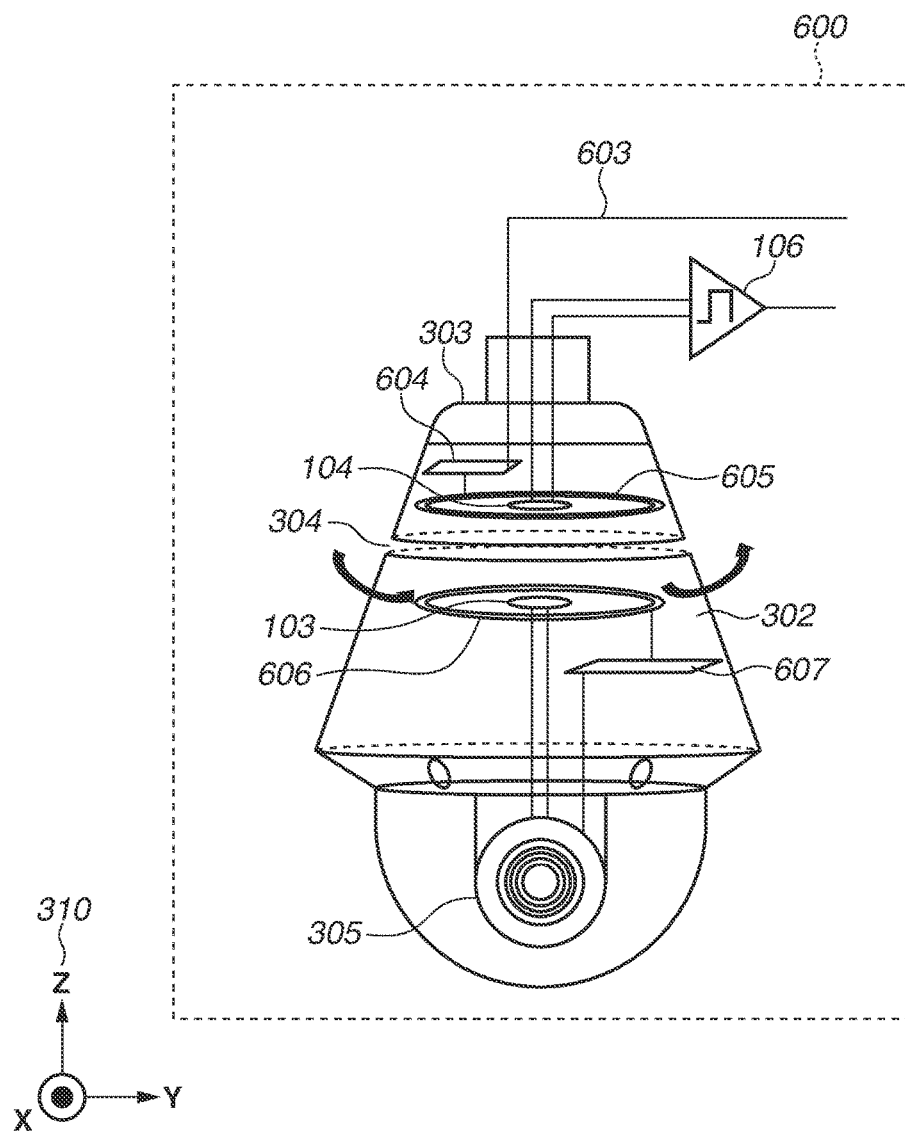
FIG. 5 illustrates a configuration of a wireless communication system carrying out wireless power transmission.

FIG. 5 illustrates an example in which the system 100 carrying out the wireless power transmission in addition to the wireless communication is applied to a network camera 600. The same reference numerals as those in FIG. 3 are assigned to similar components in FIG. 5. The network camera 600 includes a power line 603, a direct-current (DC)/alternating-current (AC) conversion circuit 604 (hereinafter referred to as a conversion circuit 604), a power transmission antenna 605, a power reception antenna 606, and a rectification circuit 607, in addition to the configuration of the network camera 300 illustrated in FIG. 3.

The wireless power transmission based on the electromagnetic field coupling is carried out between the power transmission antenna 605 and the power reception antenna 606. It is desirable to carry out the wireless power transmission based on the magnetic field coupling, such as the electromagnetic induction method and the magnetic field resonance method to prevent or reduce interference of an electromagnetic field generated for the wireless power transmission, with the wireless communication based on the electric field coupling between the coupler 103 and the coupler 104. Therefore, in the present exemplary embodiment, the network camera 600 will be described referring to an example in which the power transmission antenna 605 and the power reception antenna 606 are each a coiled conductor and the wireless power transmission is carried out based on the magnetic field coupling. However, the wireless power transmission is not limited thereto, and can be carried out out based on the electric field coupling with, for example, the power transmission antenna 605 and the power reception antenna 606 functioning as the electrodes.

The power line 603 supplies DC (direct-current) power to the conversion circuit 604. The conversion circuit 604 converts the supplied power into AC (alternating-current) power, and inputs the converted AC power to the power transmission antenna 605. The AC power input to the power transmission antenna 605 is transmitted to the power reception antenna 606 using the magnetic field coupling. The power reception antenna 606 supplies the received AC power to the rectification circuit 607. The rectification circuit 607 then converts the supplied AC power into DC power, and supplies the converted DC power to a functional unit (for example, the imaging control unit 305) in the network camera 600. In this manner, the network camera 600 controls the wireless power transmission between the power transmission antenna 605 and the power reception antenna 606 using the conversion circuit 604 and the rectification circuit 607.

FIG. 6 illustrates detailed configurations of the coupler 103, the coupler 104, the power transmission antenna 605, and the power reception antenna 606 at the connection portion 304 illustrated in FIG. 5. As viewed from the Z-axis direction of the coordinate system 310, the coupler 103 is located inside a loop formed by the power reception antenna 606, and the coupler 104 is located inside a loop formed by the power transmission antenna 605. If the network camera 600 is configured in this manner, a positional relationship between the power transmission antenna 605 and the power reception antenna 606 is prevented from being largely changed even when the imaging unit 302 is rotated, so that stability of the power transmission can be improved. The stability of the power transmission can also be improved by concentrically positioning the power transmission antenna 605 and the coupler 104 and concentrically positioning the power reception antenna 606 and the coupler 103.

When the power is input to the power transmission antenna 605, a magnetic flux 701 is generated at the connection portion 304, and the power reception antenna 606 receives the power via this magnetic flux 701. In the case where the coupler 103 is shaped as illustrated in FIGS. 4A to 4D, it is conceivable that the magnetic flux 701 penetrates through a closed-loop electrode, like the electrode 401, the electrode 403, the electrode 405, and the electrode 406, so that an induced electromotive force is generated at the coupler 103. Therefore, the electrode of the coupler 103 can be formed into a shape having a slit, as illustrated in FIGS. 7A to 7D, to reduce such an induced electromotive force that can become noise.

Figures 7A, 7B, 7C, 7D:
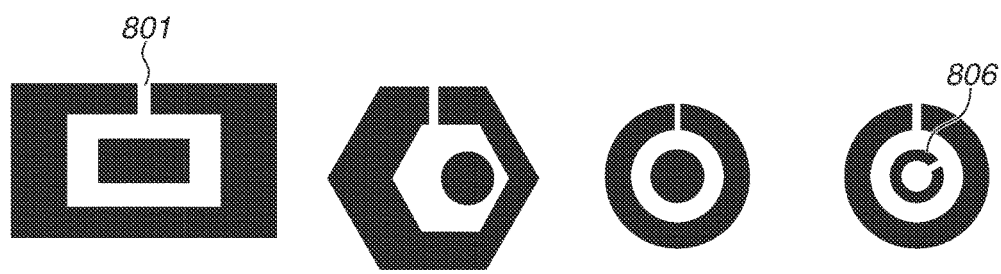
FIGS. 7A to 7D illustrate examples of a shape of a coupler having a slit.

FIGS. 7A to 7D illustrate shapes of the coupler 103 illustrated in FIGS. 4A to 4D with slits added thereto, respectively. For example, an electrode 801 illustrated in FIG. 7A includes a shape of the electrode 401 illustrated in FIG. 4A with a slit added thereto, and a slit connecting an outside of the electrode 801 and an inside of the electrode 801, which is provided with a bored portion. If the electrode of the coupler 103 is provided with such a slit, the induced electromotive force generated at the coupler 103 due to the magnetic flux 701 is reduced, so that occurrence of the noise in the wireless communication between the coupler 103 and the coupler 104 is prevented and thus the stability of the communication can be improved. In a case where an inner electrode 806 of the coupler 103 also has a bored portion, as illustrated in FIG. 7D, the stability of the communication can be improved by forming the inner electrode 806 into a shape including a slit.

In a case where the coupler 104 is also formed into the shape including the slit similarly to the coupler 103, the degree coupling between the couplers 103 and 104 varies based on the change in the orientation of the coupler 103 relative to the coupler 104. Therefore, it is desirable to set a width of the slit to be narrow enough to prevent the variation of the coupling degree from exceeding an allowable predetermined threshold value in the system 100.

[Exemplary Modification]

Figure 8:
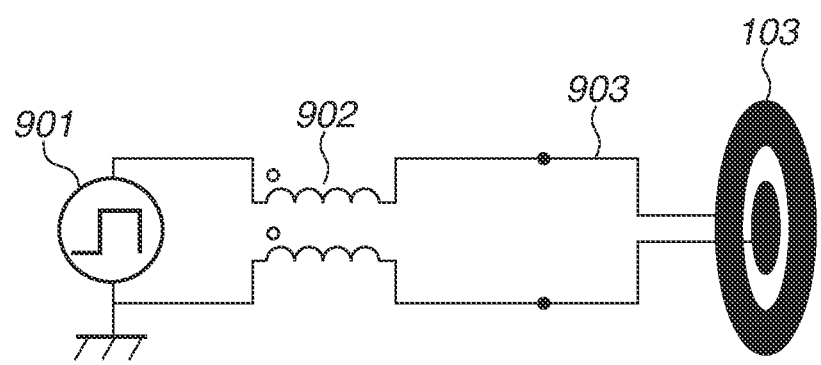
FIG. 8 illustrates a configuration of a wireless communication system including a balun.

In the following description, an exemplary modification of the above-described system 100 will be described. FIG. 8 illustrates a configuration example in a case where a balun 902 for changing an electric signal input from a signal source 901 to the coupler 103 is added to the power transmission side (a left side of the coupler 103) in the system 100 illustrated in FIG. 1. The coupler 103 is similar to the configuration in the case of FIG. 1. A signal line 903 transmits the differential signal similarly to the signal line 102 illustrated in FIG. 1.

The balun 902 is added, which is a point different from the configuration of FIG. 1, in that the signal source 901 and the coupler 103 can be isolated from each other. In other words, a reference potential can be changed between a side where the signal source 901 is located and the other side where the coupler 103 is located, which are separated by the balun 902 serving as a boundary therebetween. As a result, the present exemplary modification can prevent or reduce deterioration of the communication quality due to a mismatch of the coupling between the inner electrodes of the coupler 103 and the coupler 104, and the coupling degree between the outer electrodes of the coupler 103 and the coupler 104. The output of the electric signal from the signal source 901 is not limited to the differential output, and can also be a single-ended (single-phase) output. Even in the case where the signal source 901 provides the single-ended output, the effect of the balun 902 leads to the differential signal flowing through the signal line 903 and, the coupler 103 and the coupler 104 transmit and receive the differential signal.

In FIG. 8, the balun 902 is a Sorta-Balun, but the configuration of the balun 902 is not limited thereto. A similar effect can also be acquired by employing a method that isolates the signal source 901 and the coupler 103 from each other using a transformer instead of the balun 902.

Figure 9:
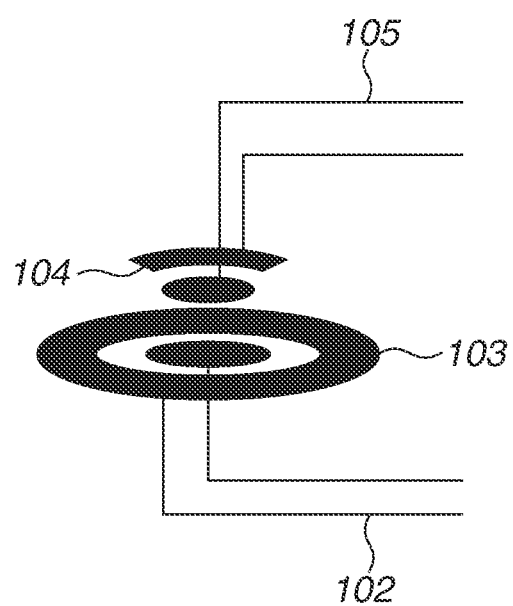
FIG. 9 illustrates an example of a case where the shapes of the couplers are different from each other.

As described above with respect to FIGS. 3 and 6, the system 100 focuses on the example in which the shape of the coupler 103 and the shape of the coupler 104 are similar to each other, but the shape of the coupler 103 and the shape of the coupler 104 are not limited thereto and can be different from each other. For example, the change in the coupling degree between the outer electrodes based on the rotational movement of the coupler 103 relative to the coupler 104 can also be kept small even when the outer electrode of the coupler 103 is formed into the nearly circular shape and the outer electrode of the coupler 104 is formed into an arc shape as illustrated in FIG. 9. Further, similarly, as long as one of the inner electrode of the coupler 103 and the inner electrode of the coupler 104 include the nearly point-symmetric shape, the change in the coupling based on the change in the orientation can be kept small even if the other inner electrode is not nearly point-symmetric.

A similar effect can be acquired even when the shape of the coupler 103 and the shape of the coupler 104 are exchanged. More specifically, in FIG. 9, the differential signal can be input from the signal line 105 to the coupler 104 and the differential signal received by the coupler 103 can be output via the signal line 102. In this case, the shaper 106 is connected to the signal line 102, and the signal source 101 is connected to the signal line 105.

In the present exemplary embodiment, the system 100 is described referring to the example in which the differential signal is uni-directionally transmitted from the coupler 103 to the coupler 104. By carrying out the communication using the differential signal, an influence of external noise in the wireless communication can be reduced compared with a case of carrying out single-ended transmission. However, how the communication is carried out is not limited thereto, and the coupler 103 shaped as described in the present exemplary embodiment can also be applied to bidirectional communication.

For example, a first electric signal can be input from the signal line 102-1 to the inner electrode of the coupler 103, and a second electric signal can be input from the signal line 105-2 to the outer electrode of the coupler 104. Then, an electric signal received by the inner electrode of the coupler 104 based on the input of the first electric signal can be output to the signal line 105-1, and an electric signal received by the outer electrode of the coupler 103 according to the input of the second electric signal can be output to the signal line 102-2. In this case, both the signal source 101 and the shaper 106 are connected to each of the signal line 102 and the signal line 105.

Even in such a case, by using the coupler 103 shaped as described above, the stability of the communication can be improved in the case where the orientation of the coupler 103 relative to the coupler 104 is changeable. Conversely, the first electric signal can be transmitted from the outer electrode of the coupler 103 to the outer electrode of the coupler 104, and the second electric signal can be transmitted from the inner electrode of the coupler 104 to the inner electrode of the coupler 103. Two-channel unidirectional baseband communication can be carried out by inputting independent electric signals regarding data pieces different from each other to the inner electrode and the outer electrode of the coupler 103.

The signal line, which is perpendicularly connected to the surface of the coupler, is illustrated in FIGS. 3, 5, 6, and 9, but the way that they are connected is not limited thereto. For example, the signal line 102 can be a micro-strip line existing on the substrate where the coupler 103 is formed. The system 100 has been described above focusing on the example in which the coupler 103 is rotationally moved, but the coupler 104 can be rotationally moved or both the coupler 103 and the coupler 104 can be rotationally moved.

The system 100 has been described above, with reference to FIGS. 3 and 5, referring to the example in which the system 100 is employed for the purpose of wireless communication performed by the network camera. However, the system 100 can also be applied to other uses. For example, the system 100 can be applied to an articulation portion of a robot arm in factory automation (FA), a rotatable display, and a communication cable for a mobile device supporting reversed insertion.

As described above, the system 100 according to the present exemplary embodiment includes a first antenna configured to carry out wireless communication based on electromagnetic field coupling between the first antenna and a second antenna. The second antenna can change an orientation relative to the first antenna around a predetermined axis. The first antenna includes a first electrode including a bored portion configured such that this axis passes through the inside of the bored portion. The first antenna includes a second electrode located inside this bored portion as viewed from a reference direction that is in parallel with this axis. The second antenna includes a third electrode configured such that an electric signal is transmitted between the first electrode and the third electrode, and a fourth electrode configured such that an electric signal is transmitted between the second electrode and the fourth electrode. Such a configuration can improve the stability of the communication in a system configured to carry out wireless communication based on electromagnetic field coupling between one antenna including a plurality of electrodes and the other antenna which orientation relative to this antenna is changeable.

According to the above-described exemplary embodiment, the stability of the communication can be improved in the system configured to carry out the wireless communication between the one antenna including the plurality of electrodes and the other antenna which orientation relative to this antenna is changeable.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-002713, filed Jan. 11, 2017, which is hereby incorporated by reference herein in its entirety.

What is claimed is:

1. A wireless communication system comprising:
a first antenna;
a second antenna with an orientation relative to the first antenna that is changeable around a predetermined axis; and
a communication control unit configured to control wireless communication based on electric field coupling between the first antenna and the second antenna, wherein the first antenna includes a first electrode including a bored portion, which is configured such that the predetermined axis passes through an inside of the bored portion, and a second electrode located inside the bored portion as viewed from a reference direction that is in parallel with the predetermined axis, and wherein the second antenna includes a third electrode configured such that an electric signal is transmitted between the first electrode and the third electrode, and a fourth electrode configured such that an electric signal is transmitted between the second electrode and the fourth electrode.

2. The wireless communication system according to claim 1, further comprising a movement control unit configured to rotationally move one or more of the first antenna and the second antenna around the predetermined axis.

3. The wireless communication system according to claim 1, wherein the first electrode includes a nearly point-symmetric shape around the predetermined axis as viewed from the reference direction.

4. The wireless communication system according to claim 1, wherein the first electrode includes an approximately circular shape.

5. The wireless communication system according to claim 1, wherein the second electrode includes a bored portion.

6. The wireless communication system according to claim 1, wherein the third electrode at least partially overlaps with the first electrode as viewed from the reference direction, wherein the fourth electrode at least partially overlaps with the second electrode as viewed from the reference direction, and wherein at one or more of the second electrode and the fourth electrode include a nearly point-symmetric shape around the predetermined axis as viewed from the reference direction.

7. The wireless communication system according to claim 1, further comprising a balun or a transformer configured to change an electric signal input from the communication control unit to the first antenna.

8. The wireless communication system according to claim 1, wherein the communication control unit inputs an electric signal to the first electrode, inputs an electric signal of opposite phase to the electric signal into the second electrode, and outputs an electric signal based on an electric signal received by the third electrode and an electric signal received by the fourth electrode.

9. The wireless communication system according to claim 1, wherein the communication control unit inputs an electric signal to the third electrode, inputs an electric signal of opposite phase to the electric signal into the fourth electrode, and outputs an electric signal based on an electric signal received by the first electrode and an electric signal received by the second electrode.

10. The wireless communication system according to claim 1, wherein the communication control unit inputs an electric signal to the first electrode, inputs an electric signal to the fourth electrode, outputs an electric signal received by the third electrode, and outputs an electric signal received by the second electrode.

11. The wireless communication system according to claim 1, further comprising:
a third antenna; and
a fourth antenna configured to carry out wireless power transmission between the third antenna and the fourth antenna, wherein the first antenna is located inside a loop formed by the third antenna as viewed from the reference direction, and wherein the second antenna is located inside a loop formed by the fourth antenna as viewed from the reference direction.

12. The wireless communication system according to claim 1, wherein the first electrode includes a slit connecting an outside of the first electrode and the bored portion of the first electrode.

13. The wireless communication system according to claim 12, wherein the second electrode includes a slit connecting an outside of the second electrode and a bored portion of the second electrode.

14. The wireless communication system according to claim 1, wherein the first antenna is included in a first portion of an imaging apparatus, wherein the second antenna is included in a second portion of the imaging apparatus, which is configured to move rotationally around the predetermined axis relative to the first portion, and wherein the communication control unit controls communication of image data based on imaging by the imaging apparatus, between the first antenna and the second antenna.

15. A communication apparatus comprising:
a first antenna with an orientation relative to a second antenna included in another communication apparatus that is changeable around a predetermined axis; and
a communication control unit configured to control wireless communication based on electric field coupling between the first antenna and the second antenna, wherein the first antenna includes a first electrode including a bored portion, which is configured such that the predetermined axis passes through an inside of the bored portion, and a second electrode located inside the bored portion as viewed from a reference direction that is in parallel with the predetermined axis.

16. The communication apparatus according to claim 15, wherein the first electrode includes a slit connecting an outside of the first electrode and the bored portion of the first electrode.

17. The communication apparatus according to claim 16, further comprising a third antenna configured to carry out wireless power transmission between the third antenna and a fourth antenna included in the another communication apparatus, wherein the first antenna is located inside a loop formed by the third antenna as viewed from the reference direction.

18. A communication method for carrying out wireless communication between a first antenna and a second antenna, the communication method comprising:
controlling rotational movement of one or more of the first antenna and the second antenna around a predetermined axis; and
controlling wireless communication based on electric field coupling between the first antenna and the second antenna, wherein the first antenna includes a first electrode including a bored portion, which is configured such that the predetermined axis passes through an inside of the bored portion, and a second electrode located inside the bored portion as viewed from a reference direction that is in parallel with the predetermined axis, and wherein the second antenna includes a third electrode configured such that an electric signal is transmitted between the first electrode and the third electrode, and a fourth electrode configured such that an electric signal is transmitted between the second electrode and the fourth electrode.

19. The communication method according to claim 18, further comprising controlling wireless power transmission between a third antenna and a fourth antenna,
   wherein the first antenna is located inside a loop formed by the third antenna as viewed from the reference direction, and
   wherein the second antenna is located inside a loop formed by the fourth antenna as viewed from the reference direction.

20. The communication method according to claim 18, further comprising transmitting a first electric signal from the first electrode to the third electrode and transmitting a second electric signal of opposite phase to the first electric signal from the second electrode to the fourth electrode.

* * * * *